United States Patent [19]
Preamprasitchai

[11] Patent Number: 6,139,052
[45] Date of Patent: *Oct. 31, 2000

[54] DUAL VARIABLE INFLATABLE SAFETY SYSTEM

[75] Inventor: Viwat Preamprasitchai, 338-33nd Ave, #6, San Francisco, Calif. 94121

[73] Assignee: Viwat Preamprasitchai, San Francisco, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/888,385

[22] Filed: Jul. 7, 1997

Related U.S. Application Data

[60] Provisional application No. 60/040,532, Mar. 11, 1997.
[51] Int. Cl.[7] .................................................. B60R 21/32
[52] U.S. Cl. ......................... 280/735; 280/729; 280/734
[58] Field of Search ................................. 280/734, 735, 280/729, 731, 730.2

[56] References Cited

U.S. PATENT DOCUMENTS

| 3,720,426 | 3/1973 | Johnston ................................. 280/735 |
| 5,202,831 | 4/1993 | Blackburn et al. ..................... 280/735 |
| 5,333,899 | 8/1994 | Witte . |
| 5,626,359 | 5/1997 | Steffens, Jr. et al. ................... 280/735 |

FOREIGN PATENT DOCUMENTS

| 3-112748 | 5/1991 | Japan ..................................... 280/729 |
| 4-78750 | 3/1992 | Japan ..................................... 280/734 |

*Primary Examiner*—Eric Culbreth

[57] ABSTRACT

A supplemental restraint system includes dual restraints, e.g. airbags, per occupant for each collision event type, such as a front-end collision with another vehicle. A primary airbag responds to crash severity (vehicle speed and deceleration) and a secondary airbag responds to passenger specific parameters, such as weight and orientation.

7 Claims, 3 Drawing Sheets

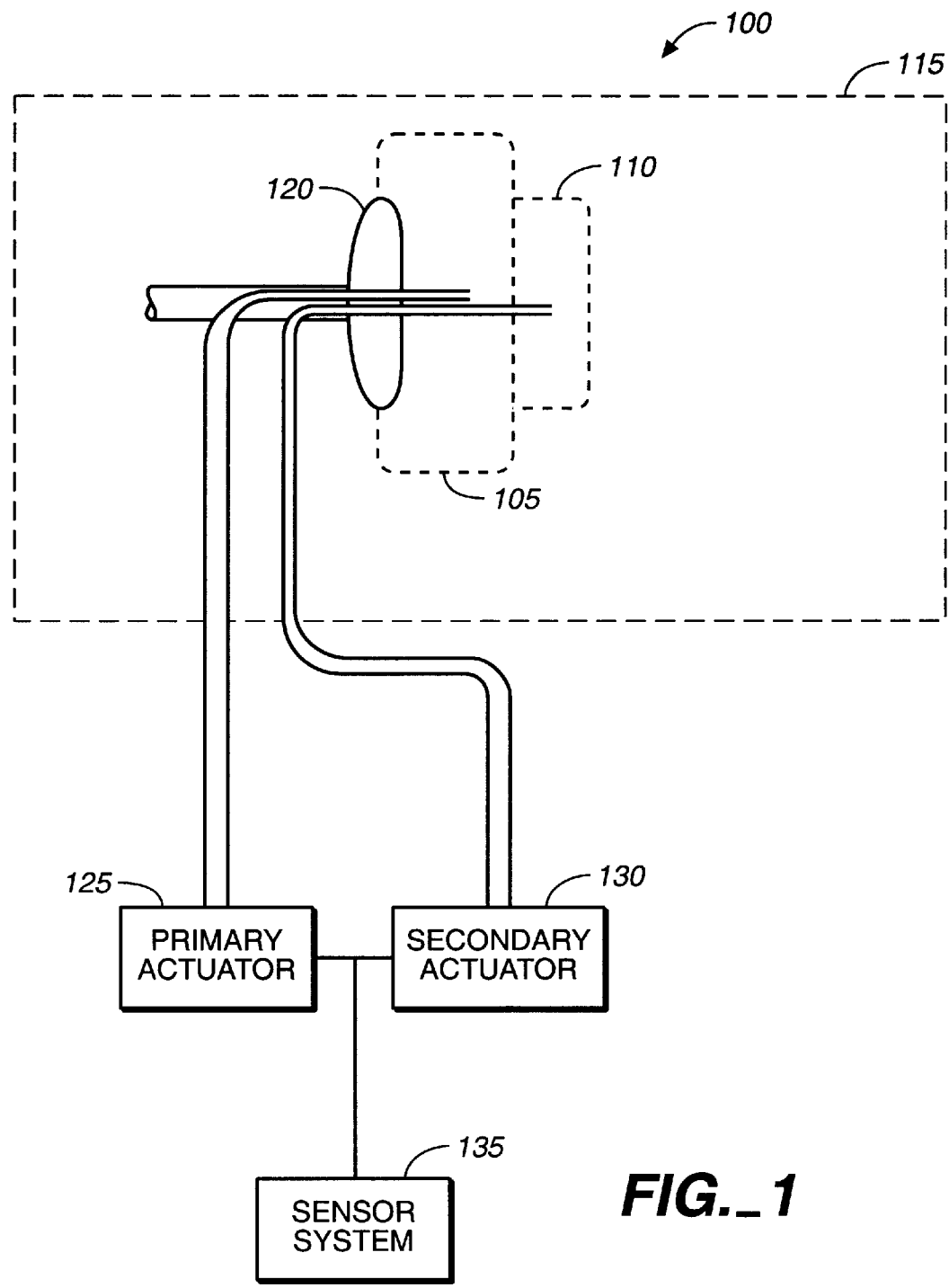
FIG._1

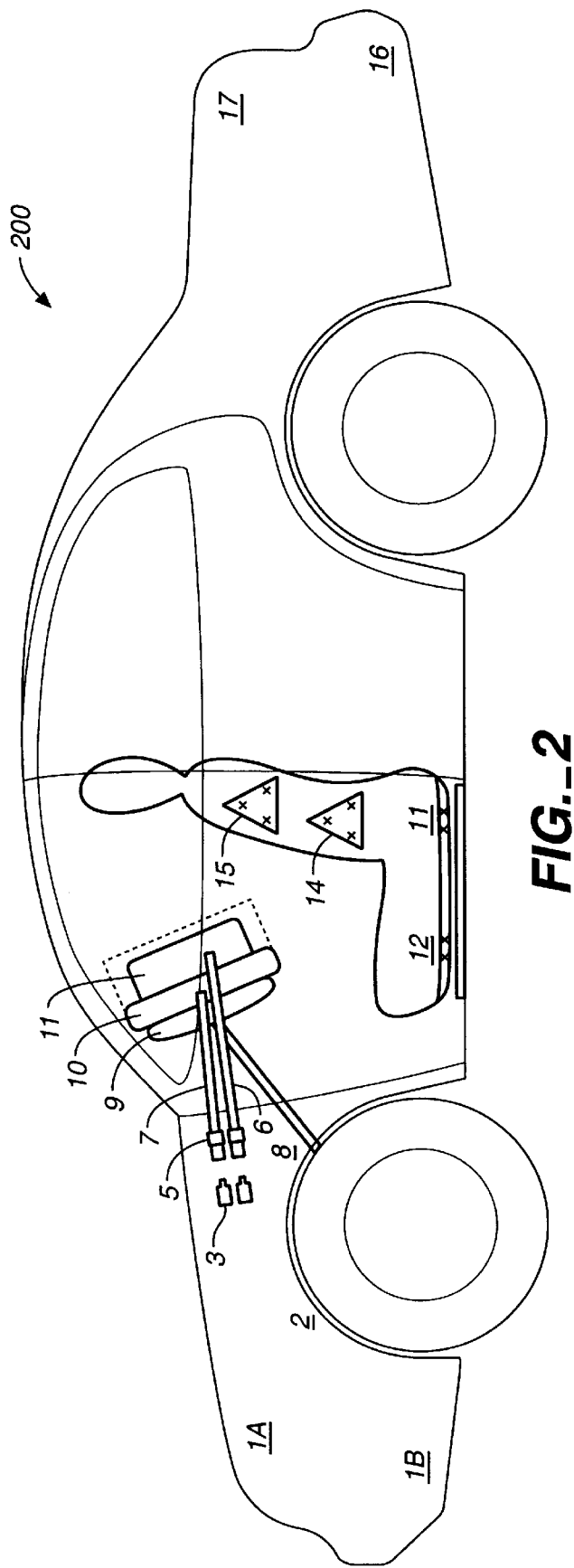
FIG._2

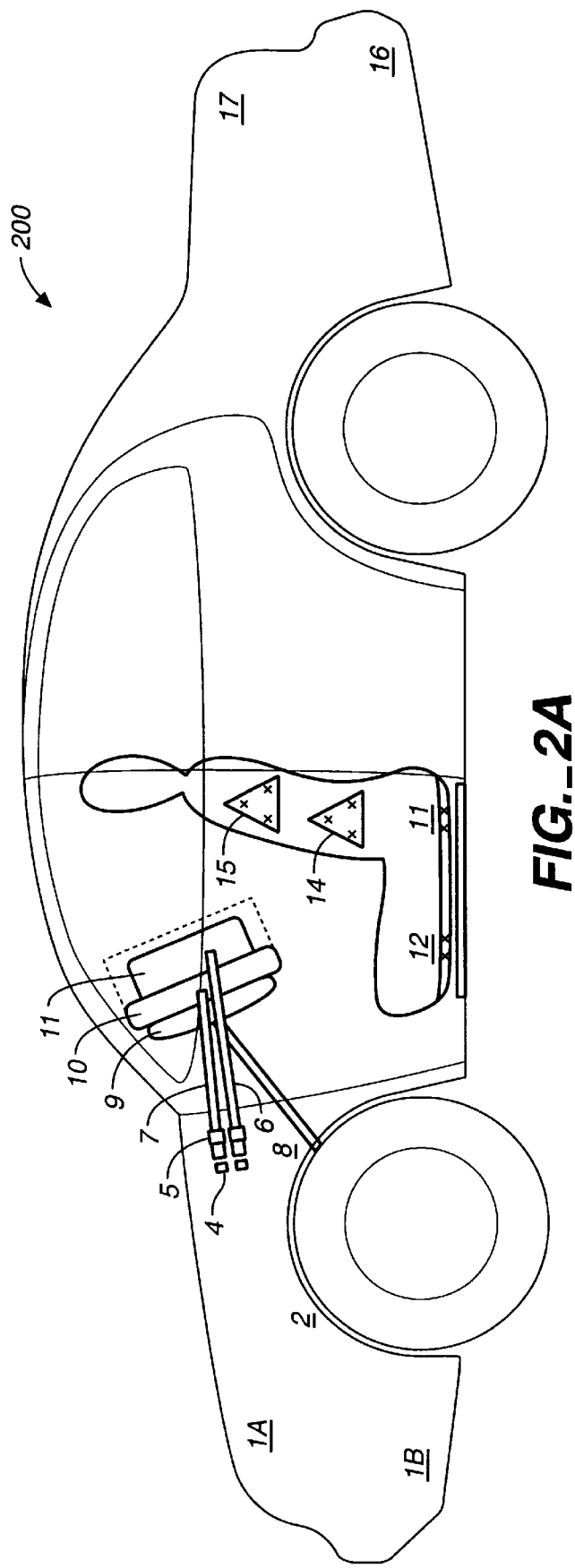
FIG._2A

DUAL VARIABLE INFLATABLE SAFETY SYSTEM

This application claims benefit of provisional application 60/040,532, filed Mar. 11, 1997.

BACKGROUND OF THE INVENTION

The invention generally relates to passenger restraint systems, and more specifically to supplemental restraint systems, such as airbags, used in passenger vehicles.

The use of restraint systems in passenger vehicles is well known to persons of ordinary skill in the art. A primary restraint system usually includes seat belts, as well as specially designed passenger compartments (e.g. roofs, doors, consoles, etc.) to maintain the passenger within the vehicle in the event of a collision. Advances in safety considerations have resulted in vehicle manufacturers installing supplemental restraint systems that enhance the safety of a passenger when used in conjunction with the primary restraint system. A common supplemental restraint system associates an airbag with one or passenger positions of the vehicle. For example, an airbag is commonly installed in a steering wheel of the passenger vehicle. This airbag is therefore associated with the driver position. Some systems provide an additional airbag for the right front passenger position.

The passenger vehicle is equipped with numerous sensors to detect a collision event involving the passenger vehicle. Most supplemental restraint systems are designed for a collision event from the front or the rear of the passenger vehicle. When the vehicle collides with an object, sensors detect the collision and, if the sensors detect conditions indicating a collision severe enough, the airbag is deployed to reduce the possibility of injury to any passenger occupying the passenger position associated with the particular airbag.

Unfortunately, this solution has drawbacks in particular situations. Some of these drawbacks include excessive restraining force for the particular passenger occupying the passenger position, inability to adequately protect a passenger for both low-force and high-force collision events; over inflation that ruptures the airbag potentially causing damage from the explosion, and under inflation that insufficiently restrains the passenger.

The present supplemental restraint systems use sensors to measure indicia of the severity of the collision event. These indicia include vehicle speed, deceleration, number of crush zone sensors activated, and pressure sensors, for example. While these indicia may reflect objective collision event parameters, actuating an airbag based upon this information alone may subject the passenger to a risk of injury from the deployment of the airbag.

It has been found that indicia associated with the passenger occupying the associated passenger position should be measured in addition to the collision event severity. For example, size, weight, and orientation information about the passenger, in addition to the collision event information, jointly controls the deployment of the airbag in a manner to reduce or minimize injury to the passenger. It is known to provide sensors in the seat of the vehicle at the associated passenger position to measure some of the attributes and to modify collision event indicia-initiated deployment of the airbag based upon passenger indicia. Thus, the single airbag is controlled based upon one set of inflation conditions that include collision event severity and passenger-specific information.

Additionally, in the prior art it is known to provide a second airbag at certain passenger positions for collision events resulting from a collision from the side of the passenger vehicle. Some vehicle manufactures install airbags in the doors of some of their vehicles that deploy in the event of a side collision event. The sensors and actuating system for the side collision event airbag are typically different from the sensors and actuating system for the front/rear collision event airbag. Collision events occurring at an angle with respect to the passenger vehicle are reduced to side and front/rear collision events and treated independently.

SUMMARY OF THE INVENTION

The present invention improves upon the prior art by providing a supplemental restraint system that is safer, more robust, and easier to adapt to the many different environments produced in a vehicle experiencing a collision event. The preferred embodiment of the present invention provides for a primary and a secondary airbag associated with a passenger position that is responsive to a single collision event. The primary airbag is responsive to a first set of inflation conditions and the secondary airbag is responsive to a second set of inflation conditions. These airbags operate cooperatively, yet are independently controllable from available indicia.

According to one preferred embodiment, a restraint system for a passenger in a vehicle, includes: a first airbag, associated with a passenger position in the vehicle; a second airbag, associated with the passenger position; a first airbag actuating system, coupled to the first airbag and responsive to a collision event, for inflating the first airbag according to a first set of inflation conditions; and a second airbag actuating system, coupled to the second airbag and responsive to the collision event, for inflating the second airbag according to a second set of inflation conditions.

Another preferred embodiment of the present invention is a method of operating a passenger restraint system for a vehicle, including the steps of: detecting a set of vehicle conditions; actuating, in response to a collision event, a first airbag, associated with a passenger position in the vehicle, according to a first set of actuation conditions derived from the set of vehicle conditions; actuating, in response to the collision event, a second airbag, associated with the passenger position, according to a second set of actuation conditions derived from the set of vehicle conditions.

Reading and reviewing the specification, appended claims and figures results in a further understanding of the present invention.

BRIEF DESCRIPTION OF THE DRAWINGS

FIG. 1 is a preferred embodiment of a supplemental restraint system according to the present invention; and FIG. 2 is an illustration of an automobile incorporating a preferred embodiment of the present invention;

FIG. 2A is an illustration of an automobile incorporating another preferred embodiment of the invention.

DESCRIPTION OF THE PREFERRED EMBODIMENT

FIG. 1 is a preferred embodiment of a supplemental restraint system 100 according to the present invention. Supplemental restraint system 100 includes a primary airbag 105 and a secondary airbag 110, both associated with a passenger position 115 of a passenger vehicle (not shown).

The deployed airbags are illustrated in phantom lines. Passenger position 115, for the purposes of this example, is a position for a driver of the passenger vehicle. As such, passenger position 115 includes a steering wheel 120. Prior to deployment, the airbags are stored in steering wheel 120 as is well known.

Supplemental restraint system 100 also includes a primary airbag actuating system 125, a supplemental airbag actuating system 130, and a sensor system 135. The actuating systems include decision logic to actuate the associated airbag in response to indicia and parameters provided from sensor system 135. The actuating systems may include sodium azide chemical mixtures, pressurized gas cartridges, or other gas source for example, for deploying the airbags as is well known in the art. The actuating systems of the preferred embodiment are provided with the same set of sensor information and collision event indicia from sensor system 135.

Sensor system 135 is a matrix of vehicle sensors and passenger sensors to measure and judge severity of a collision event, and the size, weight and orientation of a passenger at passenger position 115. As is well known, the vehicle sensors are distributed throughout the vehicle and measure many indicia, such as speed, deceleration, crushing, etc., of the collision event. The passenger sensors are distributed in the passenger seat. These sensors may indicate passenger weight, size, orientation (e.g. reclining, facing backwards, as in a child seat, for example). Any particular combination of sensors for sensor system 135 is dependent upon the vehicle type, passenger position, and other use-specific parameters.

In the preferred embodiment shown in FIG. 1, primary airbag 105 and secondary airbag 110 are stacked with primary airbag 105 behind secondary airbag 110. Secondary airbag 110 is somewhat smaller than primary airbag 105. These airbags are illustrated as being generally rectangular, though other sizes, shapes, and orientations are possible, depending upon factors to best protect any passenger occupying passenger position 115. Again, the size, shape, and orientation of the airbags is dependent upon the specific application including dimensions of passenger position 115. Alternate embodiments include the airbags being the same size, or disposed laterally to each other, or made from a single large airbag provided with two sub-parts that are independently operated as the primary and secondary airbag.

In the preferred embodiment, primary airbag 105 has a broad rectangular base sufficient by itself in most situations to protect any passenger during most collision events. Primary airbag 105 is similar to the airbags used in present supplemental restraint systems. Secondary airbag 110 is, when deployed, positioned between primary airbag 105 and a passenger in passenger position 115. Preferably, the airbags are coupled together such as by an adhesive or stitching.

In operation, primary actuating system 125, responsive to any collision event, uses the sensor information to determine whether to actuate primary airbag 105, and if so, to determine how rapidly and with how much force to deploy the airbag. Similarly, responsive to the same collision event, secondary actuating system 130, responsive to any collision event, uses the sensor information to determine whether to actuate secondary airbag 110, and if so, to determine how rapidly and with how much force to deploy the airbag. The preferred embodiment deploys primary airbag 105 based primarily on vehicle information and deploys secondary airbag 110 based primarily on passenger information. While the airbags are independently inflated, they may in certain applications be synchronized or actuated such that both airbags deploy concurrently, though independently, in any collision event. In some applications, the primary and secondary airbags may deploy dependent on each other.

The preferred embodiment has the advantage that it uses at least two airbags per passenger position for any single collision event. As a consequence, each airbag may be inflated more slowly and less forcefully than is required with a single airbag. This may lead to reduced risk of injury from the actuation of the supplemental restraint system. Additional advantages include double protection for collision events that may be too severe for a single airbag to adequately protect, as well as redundant protection should one of the airbags rupture or explode.

One method by which the inflation, and deflation, of the airbags may be controlled is through use of vent valves. It is known to use one or more vent valves with a single airbag to control excess gas, such as that produced from chemical generation of an inflating gas. In a preferred embodiment of the present invention, each airbag may be provided with such a vent for concurrent control of each individual airbag. In other embodiments, it may be desirable to have active venting, such as by a fan or other mechanism, to actively extract inflating gas to control inflation and deflation of the airbags. This active venting removes the gas as opposed to passive venting that permits gas to escape. The venting may be controlled by a vent controller (not shown) or incorporated into the actuating systems. The actuating systems match inflation and deflation to an inflation profile that controls the deployment speed, force and duration.

FIG. 2 is an illustration of an automobile 200 with the Dual Variable Inflatable Safety System (DVISS) also known in the art as the airbag. The components in this system consist of dual airbags 10 & 11 (acting as a single unit), microprocessor 8, speed sensors 2, crash sensors 1A, 1B, 16A, 16B, pressure transducers 12, 13, 14, 15, vent valves with gauges 5, pyrotechnic device 4, or pressurized gas cartridges or sodium azide chemical mix 3. This system will be powered by the vehicle's main battery but has the option to switch to its own power source if a collision event impedes the original source. During a collision event, crash sensors 1A, 1B, 16A, 16B, are triggered which sends information regarding the severity and speed of the crash to the microprocessor 8. The crash sensors may be of many known types such as a mechanical inertia switch or an accelerometer. Speed sensors 2 are alerted and the microprocessor 8 averages the most accurate speed in the collision event before calculating the proper deployment and response of the primary airbag 10. The calculations entail a series of cross referencing the current collision event data with existing preprogrammed collision data so a match may be made and calibration of the gauges 5 are set in controlling the inflation of the primary airbag. The formula used in controlling the primary airbag 10 includes the following data: the type of vehicle and composition material, crush zone of the vehicle, (collectively, vehicle make parameters), and velocity upon impact. The microprocessor triggers the pyrotechnic device 4 and gases are released which travels through the hose 7 leading to the primary airbag for inflation. When a passenger sits in the vehicle's seat and the vehicle is started, the data regarding an occupant's weight from the four sets of pressure transducers 12, 13, 14, 15, underneath the seat are processed by the microprocessor at that moment. New readings from the pressure transducers are taken each time the vehicle seat is occupied. Note that when an occupant sits in a vehicle, some of his or her weight may rest on the floor of the vehicle, so for calculation purposes a portion of the weight will be taken into account. To help with this calculation, pressure transducers in the back support 14, 15 will help provide the size or position of the occupant. Once data is calibrated for the secondary airbag 11, the microprocessor ignites the pyrotechnic device and gases travel through the hose 6 into the secondary airbag. In the preferred embodiment during a collision event, the pyrotechnic devices are ignited about simultaneously so that both the primary and secondary airbag inflate concurrently.

Microprocessor 8 may, optionally, include ROM or other memory, or may be replaced by a microcontroller, that includes preloaded parameter data for many different models or vehicle editions. These parameter data control actuation of the airbags in response to the sensor data once the particular model/edition is identified to the microprocessor or microcontroller. These parameters include data for response to crash severity, position and weight of a passenger or occupant, and model or vehicle make. For purposes of this discussion, passengers, occupants and drivers are considered equivalent.

In conclusion, the present invention provides a simple, efficient cost-effective solution to improved passenger safety using supplemental restraint systems. While the above is a complete description of the preferred embodiments of the invention, various alternatives, modifications, and equivalents may be used. Therefore, the above description should not be taken as limiting the scope of the invention which is defined by the appended claims.

What is claimed is:

1. A restraint system for a passenger in a vehicle that resides in the steering wheel or dashboard consisting of two airbags having similar shapes that are attached together either by adhesive or stitching and comprising:

a primary airbag, associated with a passenger position in the vehicle, a secondary airbag, associated with said passenger position;

a primary airbag actuating system, coupled to said primary airbag and responsive to a collision event, adjusting the inflation of said primary airbag according to crash severity; and a secondary airbag actuating system, coupled to said secondary airbag and responsive to said collision event, adjusting the inflation of said secondary airbag according to the passenger weight and position, and that the airbags inflate concurrently.

2. The restraint system of claim 1 further comprising a controller including a microprocessor unit, coupled to said actuating systems, for concurrently controlling said actuating systems in response to preloaded data defining an actuation profile in response to particular parameter data.

3. The restraint system of claim 1 wherein said airbags inflate independently but simultaneously under a different set of inflation conditions.

4. The restraint system of claim 3 wherein said airbags each include a vent and a vent valve wherein said vent valves are controlled by said respective actuating system.

5. A method of operating a passenger restraint system for a vehicle, comprising the steps of:

detecting of a set of crash severity conditions and a set of passenger parameters; actuating, in response to a collision event, a primary airbag, associated with a passenger position in the vehicle, according to a first set of actuation conditions derived from said set of crash severity conditions;

actuating concurrently, in response to said collision event, a secondary airbag stitched or adhered to the primary airbag associated with said passenger position, according to second set of actuation conditions derived from said set of passenger weight and position parameters.

6. The method of claim 5 wherein said first set of actuation conditions is different from said second set of actuation conditions yet deploys the airbags concurrently when a collision occurs.

7. The method of claim 5 wherein said primary airbag actuating step is independent from said secondary airbag actuating step and deploys the airbags concurrently in the event of a collision.

* * * * *